June 28, 1949.  A. L. LAMBERT ET AL  2,474,744
DISPENSING MEANS
Filed July 11, 1944  9 Sheets-Sheet 1
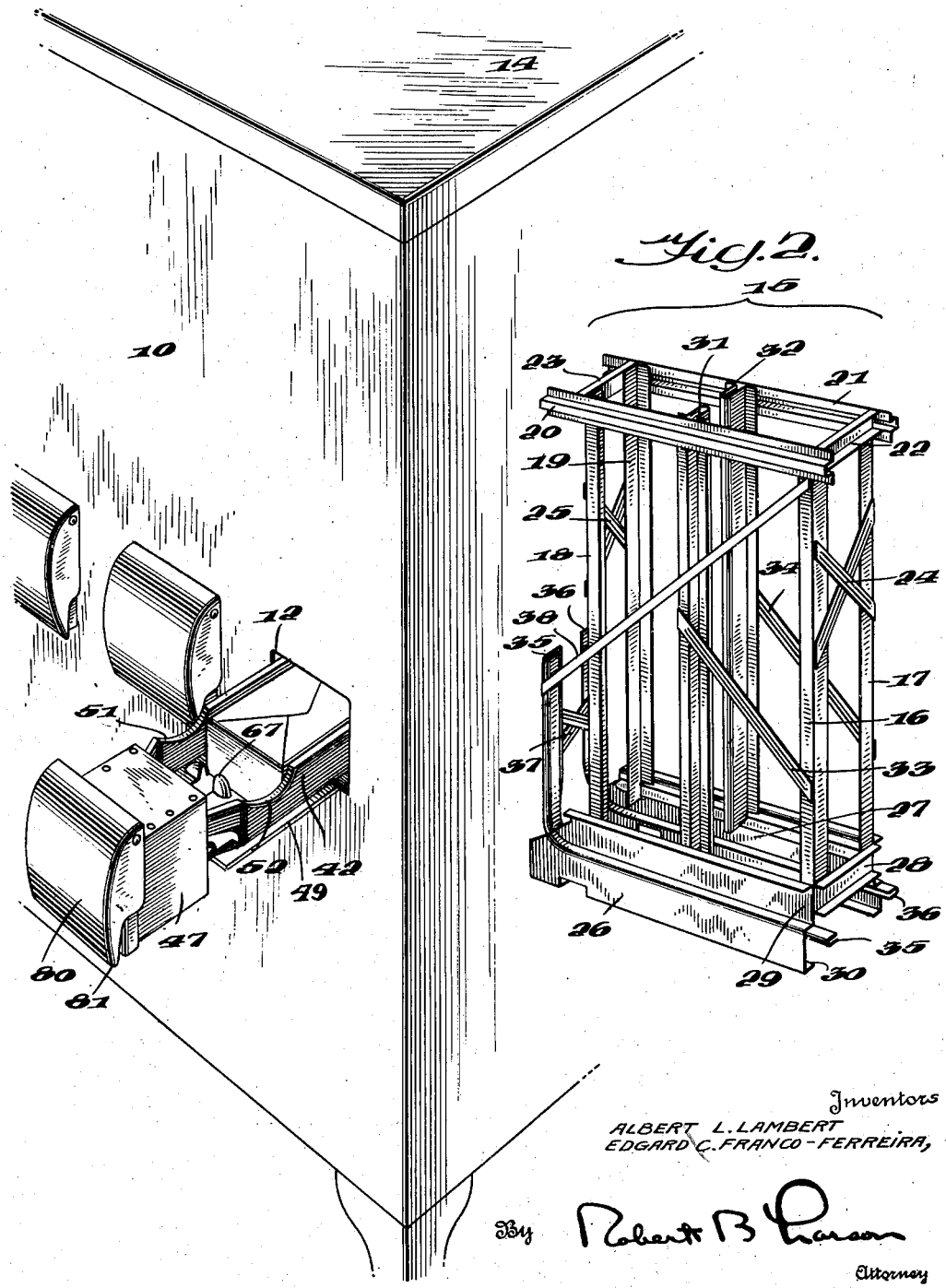
Inventors
ALBERT L. LAMBERT
EDGARD C. FRANCO-FERREIRA,
By Robert B Larson
Attorney June 28, 1949. A. L. LAMBERT ET AL 2,474,744
DISPENSING MEANS
Filed July 11, 1944 9 Sheets-Sheet 2
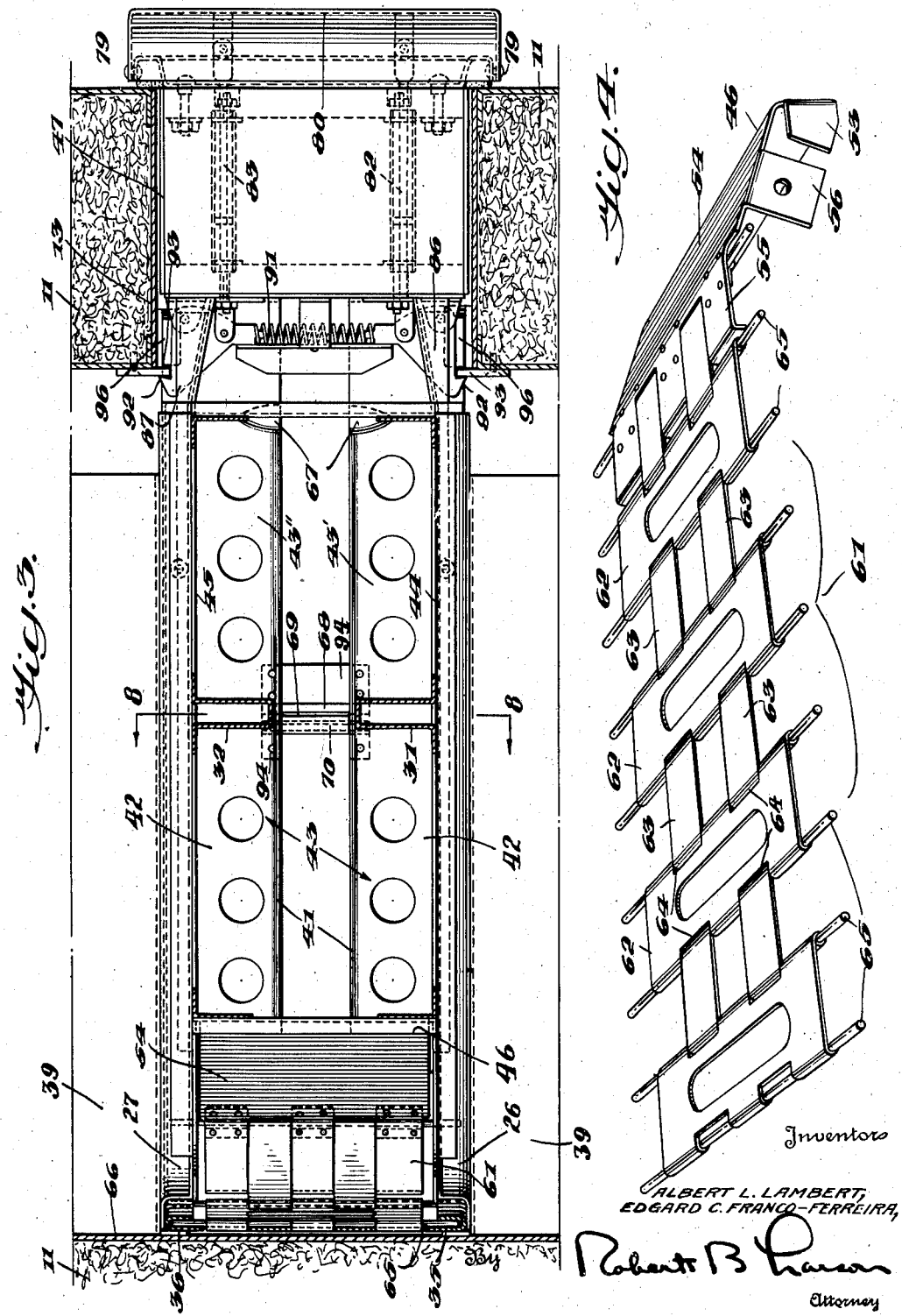
Inventors
ALBERT L. LAMBERT,
EDGARD C. FRANCO-FERREIRA,
Robert B Pearson
Attorney Inventors
ALBERT L. LAMBERT,
EDGARD C. FRANCO-FERREIRA,
By Robert B. Larson
Attorney

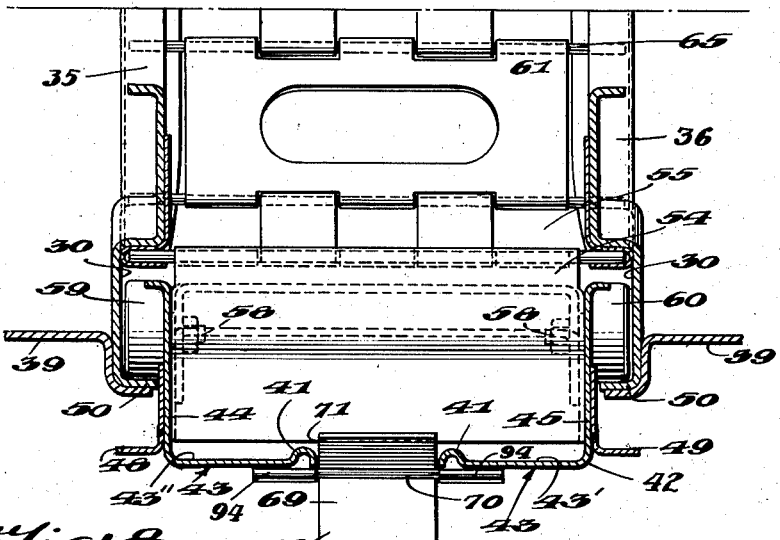

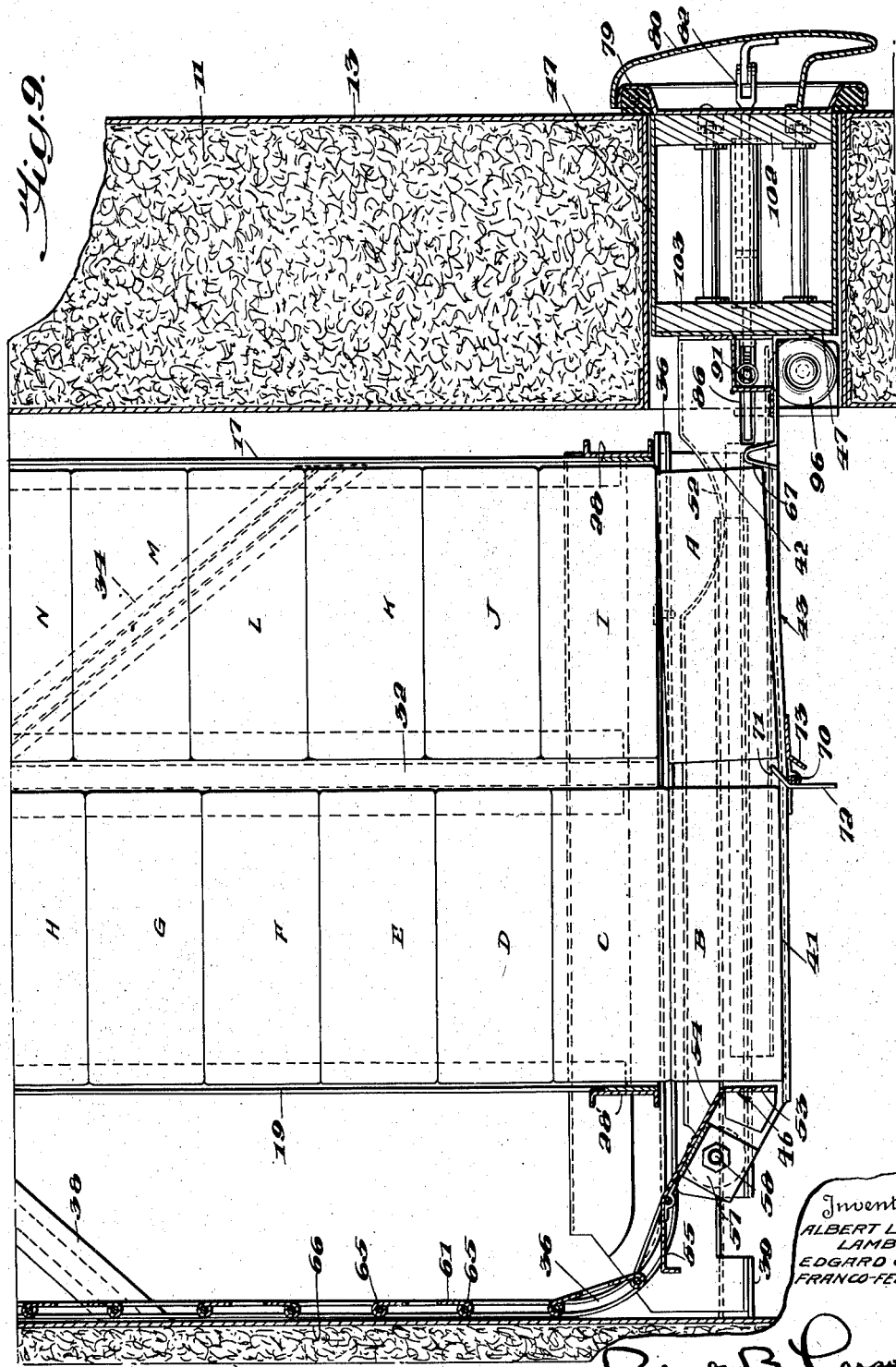

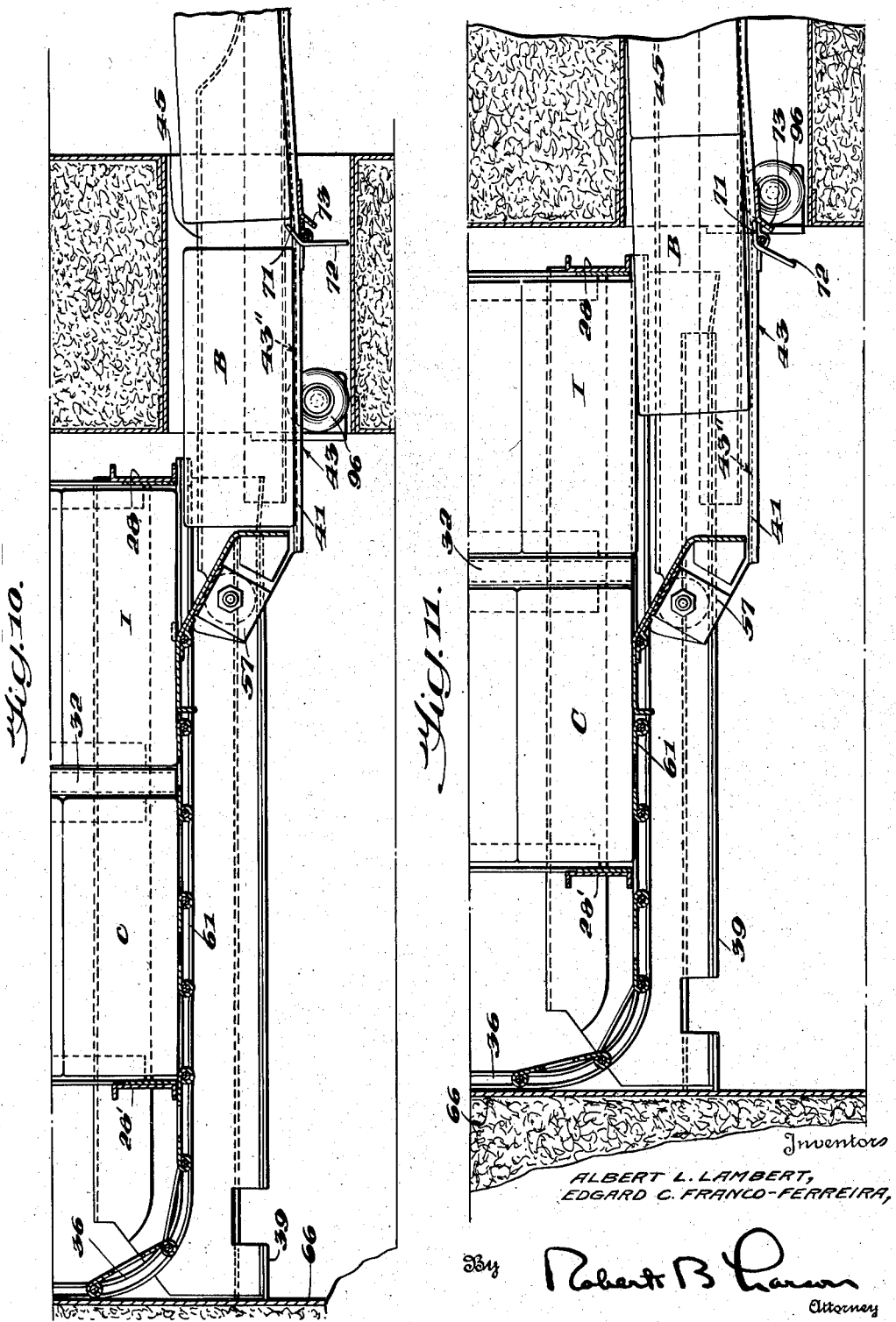

June 28, 1949. A. L. LAMBERT ET AL 2,474,744
DISPENSING MEANS
Filed July 11, 1944 9 Sheets-Sheet 7

Inventors
ALBERT L. LAMBERT,
EDGARD C. FRANCO-
FERREIRA,
By Robert B Larson
Attorney June 28, 1949.  A. L. LAMBERT ET AL  2,474,744
DISPENSING MEANS Filed July 11, 1944  9 Sheets-Sheet 8

Inventors
ALBERT L. LAMBERT,
EDGARD C. FRANCO-FERREIRA,
By Robert B. Larson
Attorney June 28, 1949.  A. L. LAMBERT ET AL  2,474,744
DISPENSING MEANS
Filed July 11, 1944   9 Sheets-Sheet 9
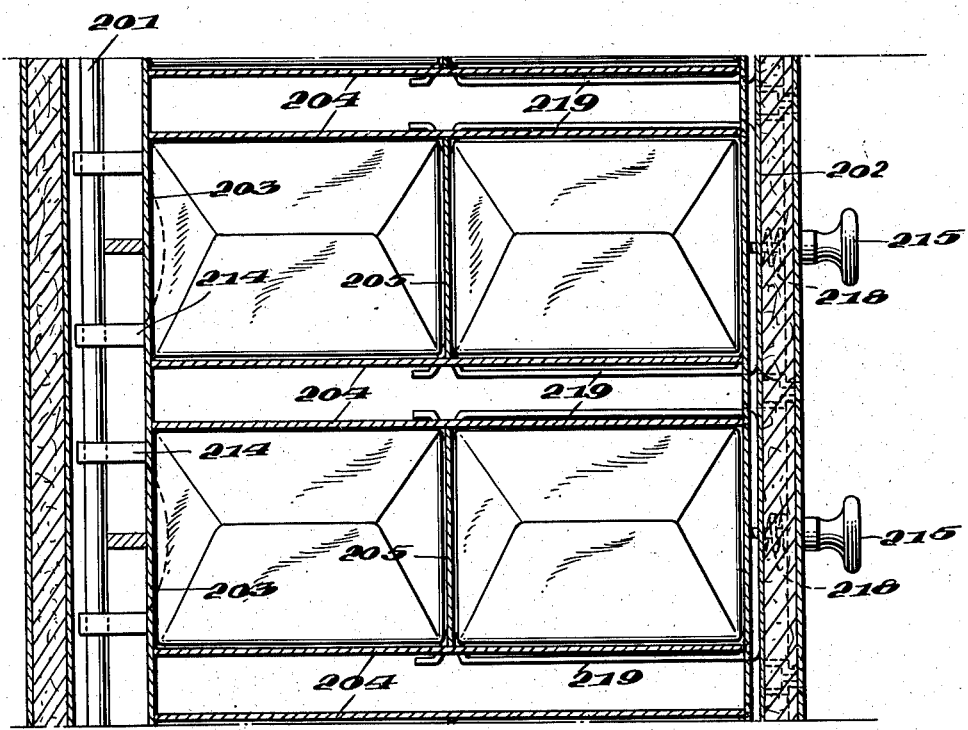
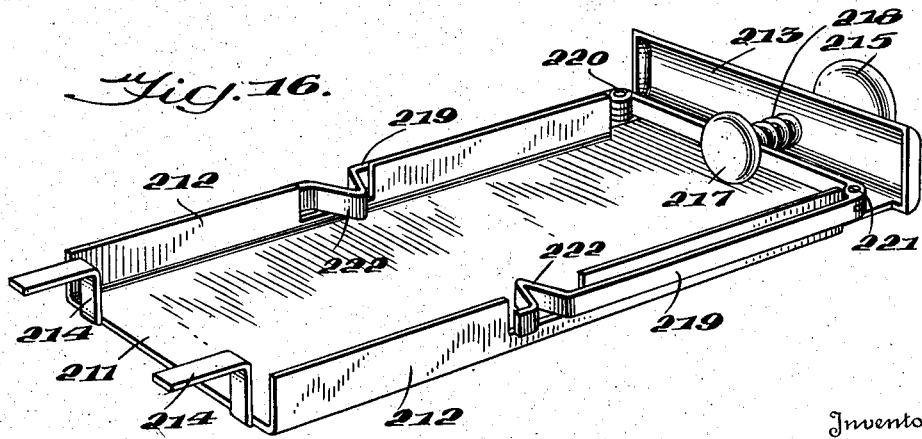
Inventors
ALBERT L. LAMBERT,
EDGARD C. FRANCO-FERREIRA,
By Robert B Pearson
Attorney Patented June 28, 1949

2,474,744

UNITED STATES PATENT OFFICE 2,474,744

DISPENSING MEANS

Albert L. Lambert, Narberth, and Edgard C. Franco-Ferreira, Jenkintown, Pa., assignors to Heintz Manufacturing Company, Philadelphia, Pa., a corporation of Pennsylvania Application July 11, 1944, Serial No. 544,354

3 Claims. (Cl. 312—67)

This invention relates to dispensing means, and more particularly to means for dispensing packaged goods from a cabinet or the like in which the dispensing means may be disposed.

One object of the invention is the provision of dispensing means for a cabinet or the like, such means comprising a frame structure adapted to be positioned within the cabinet and a drawer cooperating therewith in such a manner that each time the drawer is opened a single package from many disposed in said frame structure will be dispensed.

Another object of the invention resides in providing such a frame structure adapted for containing two adjacent stacks of packaged goods, the dispensing structure being such that each time the drawer is withdrawn packages from the rearmost stack will first be successively dispensed until the rearmost stack is depleted, after which packages from the first stack will be dispensed.

It is a further object to provide dispensing means which include an improved drawer structure including means for supporting the remaining packages in the stacks when the drawer is being moved to open and closed positions.

The invention, while capable of use in connection with the dispensing of packaged goods of many types, is particularly adapted for use in connection with refrigerated cabinets for packaged frozen foods. The invention has for an additional object, the provision of such an arrangement.

These and other objects will become more apparent from the following description and claims when read in conjunction with the accompanying drawings, in which:

Figure 1 is a partial perspective view of a cabinet provided with dispensing means in accordance with the invention.

Figure 2 is a perspective view of the removable frame unit for supporting two stacks of packages within the cabinet.

Figure 3 is a top plan view, partially in section, of the drawer structure.

Figure 4 is a perspective view of the slidable tray arrangement secured to the end of the drawer.

Figure 7 is a section taken on the line 7—7 of Figure 6.

Figure 8 is a transverse vertical section taken through the drawer and the support therefor and on the line 8—8 of Figure 3.

Figure 9 is a vertical section taken through a frozen food cabinet provided with the invention and showing the initial position of the packages to be dispensed.

Figure 10 is a partial view of the same structure showing the drawer withdrawn with the first package ready to be dispensed.

Figure 11 is a similar view showing the position of the parts as the drawer is being returned.

Figure 15 is a similar view taken on the line 15—15 of Figure 13, and

Figure 16 is a perspective view of the drawer structure.

Figure 5:
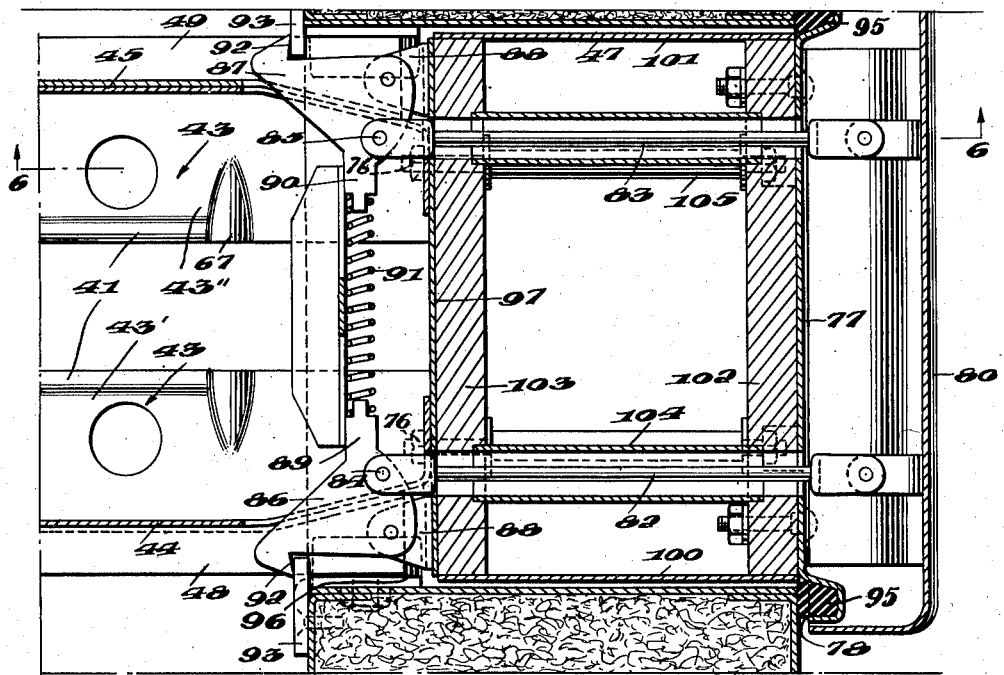
Figure 5 is an enlarged top plan view, partially in section, of the front end of the same drawer structure.

In accordance with one feature of the invention, the dispensing means is employed in connection with a cabinet adapted to contain packaged frozen foods, the cabinet being normally placed in a retail store in view of prospective customers. Such a cabinet is fully insulated and is provided with means, such as a refrigerating unit, for maintaining the interior of the cabinet at a suitable temperature. Means is provided to facilitate the replenishing of the cabinet with packaged frozen foods as the supply contained therein becomes depleted.

Further in accordance with another feature of the invention, the packages of frozen foods or the like are adapted to be supported within the cabinet in a removable frame structure capable of supporting two stacks of packages, one stack directly back of the other.

The cabinet is provided with a drawer, the bottom of which is sufficiently large for two packages. The drawer is normally disposed at the bottom of the frame structure directly underneath both stacks. When the drawer is pulled out, the drawer first contains a package from the bottom of the front stack and one from the bottom of the rear stack. Each subsequent time the drawer is pulled out and the forward package is removed, a package from the rear stack will be deposited in the drawer, so that after the first withdrawal, the drawer will contain only packages from the rear stack until that stack is depleted. Thereafter, packages from the front stack will then be successively deposited in the drawer until the packages from that stack will have all been dispensed.

In the drawings, the invention is shown as embodied in a frozen food cabinet generally identified by the reference numeral 10, which cabinet is adapted to contain a plurality of frozen food packages in the form to be sold to a customer.

The cabinet may be generally in the shape of a hollow rectangular box of metal or the like and is preferably provided on its inner walls with a relatively thick layer of insulation material 11. The cabinet is provided with one or more rectangular drawer openings 12 in its front wall 13. The top or cover 14 of the cabinet is removable or hinged.

Removably supported within the upper part of the cabinet 10 are a plurality of frame units 15, one of which is illustrated in perspective in Figure 2, there being one of such units for each drawer opening. The lower interior portion of the cabinet 10 is adapted to house a refrigeration unit (not shown) for maintaining the interior of the whole cabinet at a suitable temperature.

Each of the frame units 15 may be constructed of a plurality of angle, channel and strip members or the like which are preferably of aluminum or some light metal and which are joined together by welding, brazing, riveting or other suitable means.

As shown in Figure 2, the frame units 15 form a rectangular skeleton having front spaced uprights 16 and 17 and rear spaced uprights 18 and 19. These uprights 16, 17, 18 and 19 are connected at their upper ends by channel members 20 and 21, respectively, and by end members 22 and 23. Crossed bracing strips 24 and 25 provide additional rigidity.

At their bottom ends the uprights are secured to the upper portion of members 26 and 27 and to front and rear members 28, 28'. Each of the members 26 and 27 is preferably of sheet metal stamped to provide the channels 29 and 30 disposed in opposite directions to each other.

Two upright channel members 31 and 32 are secured to the channel members 20 and 21, respectively, at their upper ends and at their lower ends to the upper portion of the members 26 and 27. These channel members 31 and 32 are braced to the front uprights 16 and 17 by the braces 33 and 34.

The space between the channels 30 comprises a drawer space with the front of such space disposed to communicate with one of the drawer openings 12 in the cabinet when the frame unit 15 is disposed within the cabinet. These channels 30 comprise guide track members for a drawer, as will be presently described.

The upper surfaces of the channels 30 are each provided with track members 35 and 36 of U-section disposed with their openings facing each other and which extend forwardly from the front end of the unit for a short distance. At the rear the track members are curved upwardly so as to be parallel with the rear uprights 18 and 19. A cross brace 37 supports the track members 35, 36 with respect to each other and a brace strip 38 supports them with respect to the uprights 18 and 16 and the channel member 31 of the frame unit.

It will be understood that each of these frame units is adapted to support two stacks of packages therein, the space between the front stack and the rear stack being separated by the two channel uprights 31 and 32.

The manner in which each frame unit may be supported within the cabinet is shown, for example, in Figures 8, 9, 10 and 11. The inner walls of the cabinet are provided with angle strips 39 providing ledges on which the members 26 and 27 of the frame unit rest when the frame unit is inserted in the cabinet from above. The strips 39 may be welded or otherwise secured to the inner walls of the cabinet.

With reference to Figures 1, 3, 8 and 9, the drawer 42 is generally rectangular and has a bottom 43, side walls 44 and 45, and a rear end member 46. At its front, the drawer proper is connected to a rectangular box-shaped structure or plug 47, substantially the size of the drawer opening 12 in the front insulated wall 13 of the cabinet 10.

The side walls 44 and 45 have laterally extending flange members 48 and 49 (Figure 8). The side walls 44 and 45 are also formed with arcuate cut-outs 51 and 52 (Figure 1) to facilitate removal of a package when the drawer is pulled fully out.

The rear end member 46 of the drawer (see Figures 4 and 9 in particular) has a vertical portion 53 extending substantially half the height of the drawer, a rearwardly and upwardly sloping portion 54 and finally, a horizontal portion 55. The sloping portion 54 has angle members 56, 57 extending downwardly from its side edges. These angle members 56, 57 support the axles 58 for the rollers 59 and 60 (Figure 8) which are adapted to ride on the ledges 50 formed by the lower portions of the channel 30 when the drawer is moved inwardly and outwardly.

The rear horizontal portion 55 of the drawer 42 connects with a tray 61 which is shown in perspective in Figure 4. The tray 61 is relatively flexible in one direction and may be comprised of a series of plate members such as 62 and 63. The plate members 62 are provided with notches 64 to receive the ends of the plates 63. Both plates 62 and 63 have their opposite edges curled to receive the metal rods 65 which consequently hold the plates together.

The ends of the rods 65 extend laterally beyond the tray proper and these ends are adapted to be disposed in the track members 35, 36 (see Figures 2, 9, 10 and 11).

When the drawer is fully inserted, the tray 61 (guided in the upwardly extending portions of the track members 35 and 36) is positioned parallel to the rear wall 66 of the cabinet. As the drawer is pulled outwardly the tray (riding in the track members) assumes a horizontal position so that when the drawer is drawn to open position, the tray supports the two stacks of packages disposed in the frame unit 15 as will be presently described.

The bottom 43 of the drawer is formed of two strips 43' and 43'' separated to provide a longitudinal slot down the middle. The facing edges of these strips are beaded as at 41 (see Figure 8) which prevents packages from resting directly on the bottom and causes them to slide easily relatively to the drawer.

The strips 43' and 43'' of the bottom are also provided with transverse ridge members 67 which prevent a package in the drawer from moving forwardly too far.

Intermediate the bottom 43 of the drawer proper and on the underside is a plate 94 provided with a transverse opening 68 (Figure 3) aligned with the slot in the drawer bottom. A flap member 69 (Figures 3, 8 and 9) is pivoted on rod 70 supported between plate 94 and bottom of the drawer. Normally the portion 71 of the flap extends upwardly into the drawer, since the lower portion 72 of the flap is larger and heavier. The plate 94 has a stop member 73 (Figure 9) secured adjacent the opening 68. The purpose of the flap 69 and of the stop 73 will be later explained.

Figure 6:
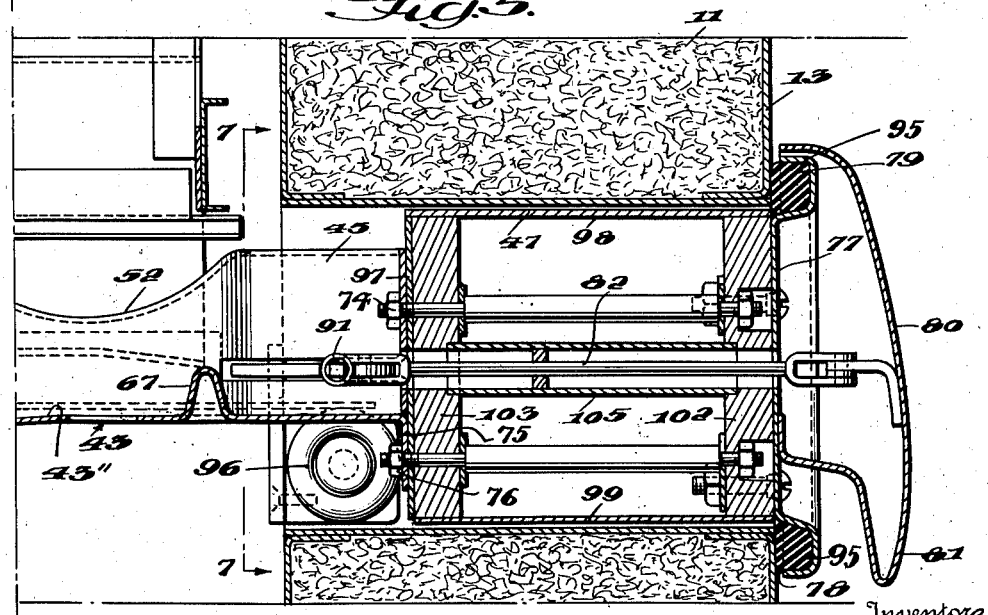
Figure 6 is a vertical section taken on the line 6—6 of Figure 5.

The drawer proper is connected to the rectangular box-like structure 47 in the manner shown best in Figures 5 and 6. The side walls 44 and 45 of the drawer are bent inwardly and are joined to the rear wall of the box-like structure 47 by means of the bolts 74. The bottom 43 of the drawer at its forward end is flanged downwardly as at 75 (see Figure 6) and is likewise secured to the rear wall of the box-like structure 47 by means of the bolts 76.

The drawer may be provided with the latching mechanism shown, for example, in Figures 5, 6 and 7. The front end of the box-like structure 47 has a plate 77 secured thereto, the plate being formed at its periphery as a channel 78. A rubber gasket 95 is disposed in this channel and is adapted to bear against the front wall 13 of the cabinet 10 when the drawer is closed, thus completely sealing the refrigerated area inside of the cabinet.

Pivoted to the plate 77 as at 79 (see Figures 3, 6 and 7) is the handle 80 of sheet metal or the like, which is formed with a grasping ledge 81. Secured to the inner surface of the handle 80 are two rod assemblies 82 and 83 which pass rearwardly through openings in the box-like structure and at their rear ends are pivoted as at 84 and 85 to latch members 86 and 87, respectively. The latch members are pivotally mounted on lugs 88 secured to the rear surface of the box-like structure 47. The latch members are each provided with inwardly extending projections 89, 90. A coil spring 91 is disposed between the projections and urges the latch members outwardly.

The latch members 86, 87 are each provided with a hook 92, adapted, when the drawer is closed, to engage the catch members 93 secured to the inner surfaces of the front wall 13 of the cabinet at the side edges of the drawer opening 12 and extending into said opening as shown in Figure 5.

When the handle 80 is pivoted upwardly, the rod assemblies 82 and 83 will be drawn forwardly. This movement in turn causes the latch members 86 and 87 to pivot inwardly against the action of the coil spring until the hooks 92 become disengaged from the catch members 93. Continued pull on the drawer handle 80 will draw the drawer outwardly.

With reference to Figures 5 and 6, it will be noted that the side walls of the drawer opening in the cabinet are provided with rollers 96 which extend into the opening and on which the members 48 and 49 of the drawer rides when the drawer is moved to open and closed position.

When the drawer is returned to closed position it will be apparent that the latch members 86 and 87 will move inwardly (against the action of the spring) until they strike the catches 93 when the hooks 92 drop over the catches to hold the drawer in closed position.

The box-like structure 47 disposed in front of the drawer proper is now described as seen in Figures 5 and 6. It is formed of the front plate 77, a rear wall 97, top and bottom walls 98 and 99 respectively, and side walls 100 and 101, all of which may be of stamped sheet metal. To prevent "sweating," the box-like structure 47 is provided with the insulation blocks 102, 103 on which the stamped members are mounted. The insulation blocks may be "Bakelite" or some similar material.

Also provided within the structure 47 are the tubular members 104, 105 through which the rod assemblies 82 and 83 pass.

The novel manner in which the structure described dispenses packages will now be described.

For purposes of explaining the operation, the packages are indicated in the drawings by successive letters of the alphabet in the order in which the packages are to be dispensed.

Upon insertion of the filled frame unit 15 the package A (see Figure 9) will fall into the front portion of the drawer, and the package B into the rear portion of the drawer.

When the drawer is withdrawn for the sale of a package from the position as shown in Figure 9 and the front package is in the opening in the front wall, the package B in the rear portion of the drawer will support the front stack of packages I, J, K, L, M and N, and the tray 61 (guided by the track members 35, 36) becomes disposed so as to support the rear stack of packages C, D, E, F, G and H. If the drawer is drawn forwardly even a greater distance the front stack of packages will also be supported partially by the tray 61. Movement of the tray beneath the forward stack is facilitated by sloping portion 54 of the rear wall of the drawer which has a cam-like action on the packages in the front stack as the drawer moves to its fully open position.

When the package A is withdrawn (Figure 10) and the drawer is again returned to its closed position, the package B in the rear portion of the drawer will, because of the weight of the packages of the front stack thereon, remain relatively stationary, the drawer sliding therebeneath (see Figure 11) so that when the drawer is fully closed the package B will be disposed in the front portion of the drawer. During the movement of the drawer to closed position, tray 61 holds the weight of the front stack off of package B (Fig. 10) until tray 61 moves clear of the front stack. Thereafter, as the drawer moves rearwardly, ridge members 67 push package B rearwardly to the position of package A in Fig. 9. As the tray 61 also moves rearwardly in the tracks, package C from the rear stack finally drops into the rear portion of the drawer.

It will be noted that as the drawer is successively withdrawn as sales of packages are made, the packages from the rear stack will be dispensed first until that stack is depleted. When this occurs, the package I will drop into the rear portion of the drawer, after the drawer is opened and the last package from the rear stack is removed and the drawer is then returned to closed position, the weight of the front stack on package I will permit the drawer to slide therebeneath so that package I becomes disposed in the front portion of the drawer.

After package I is withdrawn for sale and the drawer is moved to closed position, the package J will first drop into the rear portion of the drawer but as the weight of the front stack bears on its upper surface, package J will remain relatively stationary as the drawer slides therebeneath so that package J will be in the front portion of the drawer when the closing is completed.

When the drawer is again drawn open for the next sale, package J remains in the front portion of the drawer by reason of the flap 69, the upper portion 71 of which assumes a vertical position as the lower portion 72 engages the stop 73. If it were not for the flap 69, the weight of the front stack would cause the drawer to slide relatively to package J.

When package J is in the front portion of the drawer, package K drops in the rear portion of the drawer. After package J is removed and as the drawer is again closed, package K will remain relatively stationary as the drawer slides therebeneath so that package K ends up in the front portion of the drawer.

This action successively occurs each time the drawer is opened and a package withdrawn until the front stack is depleted.

To replenish the stacks, packages may be inserted into the frame unit from above through the top of the cabinet.

A modified form of the invention is illustrated in Figures 12 to 16, inclusive. In this arrangement a cabinet 200 having insulated walls is provided with cooling tubes 201 disposed adjacent to the inner surfaces of said walls.

Figure 13:
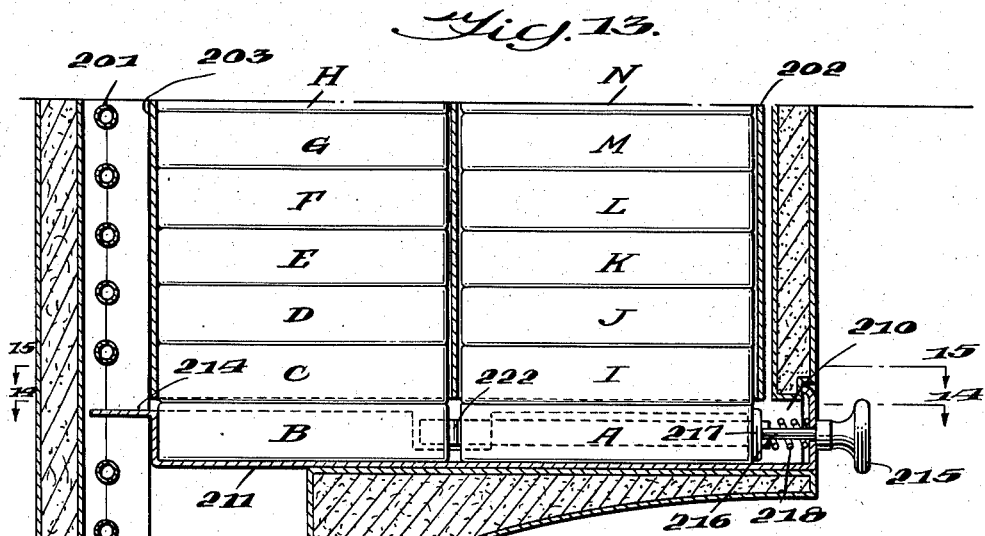
Figure 13 is an enlarged sectional detail view of the drawer and stack structure of the embodiment of Figure 12.
Figure 14:
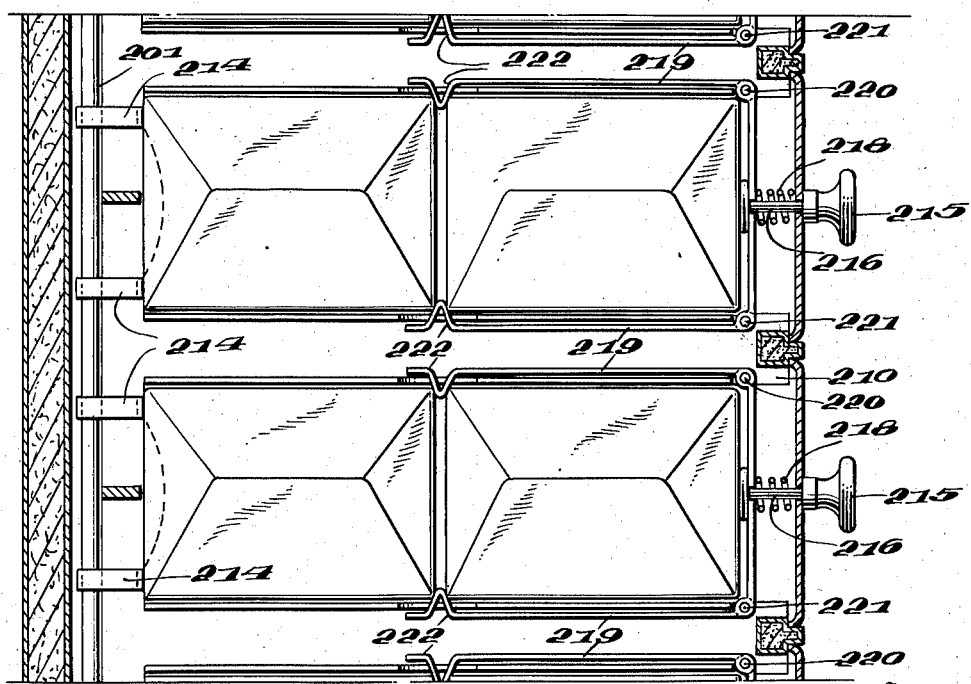
Figure 14 is a horizontal section through the invention taken on the line 14—14 of Figure 13.

The upper portion of the cabinet is provided with means for stacking packaged frozen food packages. This means is comprised of one or more box-like compartments of aluminum or the like and includes a front wall 202, a back wall 203, side walls 204, and intermediate partitions 205. In Figure 13 the partitions 205 are shown as dividing each compartment into front and back portions, each of which is adapted to house a stack of packaged goods. These aluminum walls are connected by heat conducting metal strips (not shown) to the cooling tubes 201 to be cooled thereby. The strips may be welded to the walls and to the cooling tubes. Each wall, in effect, comprises a cold plate due to the fact that all of the walls are connected by heat conducting metal to the cooling tubes 201.

Figure 12:
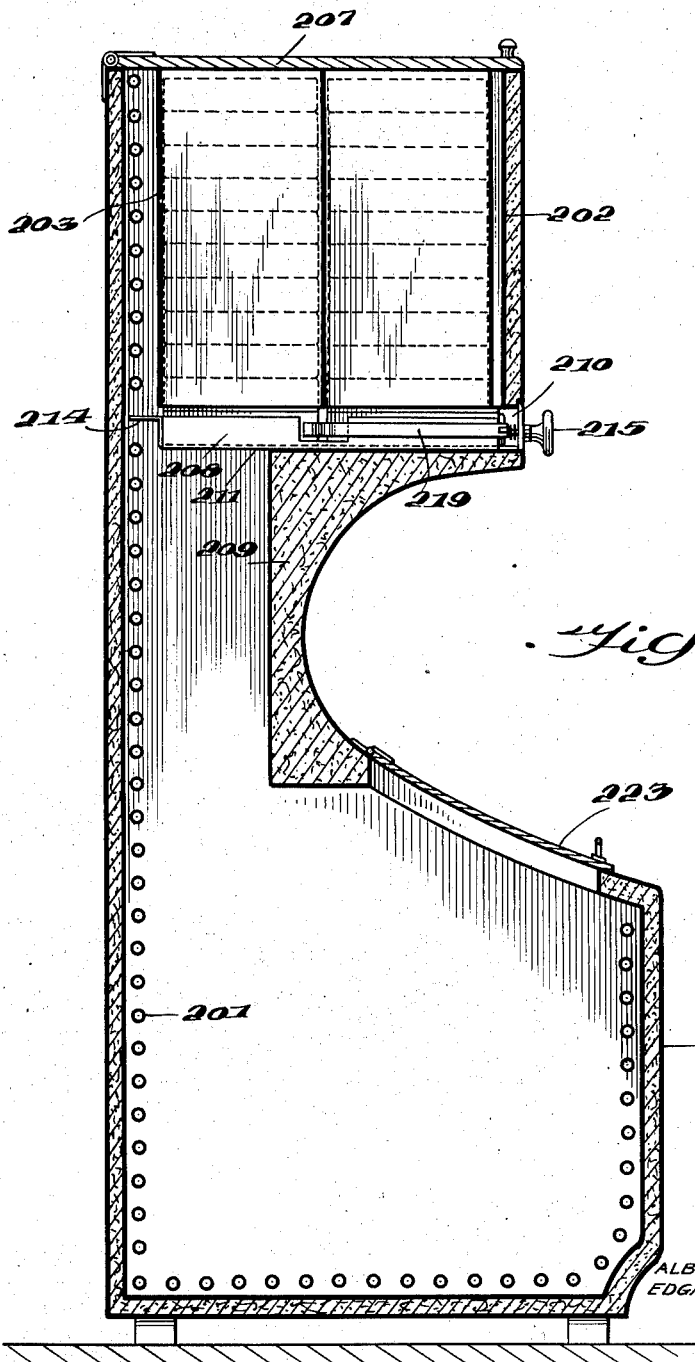
Figure 12 is a cross section taken through a modified form of the invention.

The upper ends of the compartments are open and the compartments may thus be refilled with a supply of packages by opening the hinged top 207 of the cabinet (Fig. 12).

The compartments are also open at the bottom so that packages therefrom may drop into the drawers 208 disposed directly therebeneath. The drawers are supported by the upper surface of the insulated member 209 on which they are adapted to slide inwardly and outwardly through drawer openings 210. Each drawer is adapted to hold two packages, one in the forward portion beneath the front stack of packages, and one in the rear portion beneath the rear stack of packages.

The construction of each drawer 208 is best seen in Figure 16. It is comprised of a bottom 211, side walls 212 and a front wall 213. At the rear end are upstanding members 214, provided with rearwardly extending portions.

The front wall 213 is provided with a handle 215 having a stem 216 (see Fig. 14) and a button member 217. A coil spring 218 surrounds the stem 216 and urges the handle 215 to the position shown by pressing against a member 219 on the button member 217 and the inner surface of the front wall 213.

Each drawer 218 is provided with a pair of L-shaped clamping members 219 which are supported at the corners of the L's for pivotal movement about the front ends of the side walls of the drawer as at 220, 221, respectively. One end of each clamping member 219 normally engages the front surface of the button member 217. The other end of each clamping member 219 is provided with an inwardly bent portion 222. Such bent portions 222 are adapted to project inwardly through cutouts in the side walls of the drawer and between the two packages when the drawer is filled.

The operation of this embodiment should now be quite apparent. When the drawer handle 215 is first drawn forwardly to open the drawer, the pull exerted by the operator on the button member 217 will cause the clamping members 219 to pivot slightly and grip the front package A. Continued pull on the handle will withdraw the drawer so that the first package A may be withdrawn (see Fig. 13). Package B then is at the front of the drawer beneath the front stack of packages. The rearwardly extending portions of members 214 at the rear of the drawer then support the rear stack of packages. When the drawer is then returned to closed position, the weight of the front stack of packages on package B will cause it to remain forwardly while the drawer slides rearwardly, so that when the drawer is completely closed, package B is at the front of the drawer, and package C has dropped into the rear portion of the drawer.

Subsequent withdrawals of the drawer for removal of packages will result in depleting the rear stack of packages first.

After the rear stack has been depleted, package I from the front stack will fall into the front portion of the drawer. When the drawer is then withdrawn by pulling on the handle 215, the clamping members 219 will pivot and their bent portions 222 will engage the rear edge of the package so that it remains in the front portion of the drawer until it is removed. The next package in the front stack drops in the rear of the drawer. When the drawer is then returned to closed position the weight of the front stack on the package in the rear of the drawer will cause it to remain forwardly while the drawer slides rearwardly. During such movement the portions 222 of the clamping members 219 will be forced outwardly. Subsequent withdrawals of the drawer will naturally result in depletion of the front stack in the manner described.

The lower portion of the cabinet may be used for storing packaged foods, and these may be removed by lifting the hinged cover 223. This portion of the cabinet may also house the refrigerating unit (not shown).

One advantage of this embodiment is that packages of different heights may be dispensed, as long as the height is not greater than the drawer opening and all packages are of the same cross section. Generally, the embodiment possesses the advantage of simplicity of construction and reliability of operation.

It should be manifest that many changes in the structure and arrangement of the parts may be made without departing from the invention which consequently should not be limited to the embodiment described and illustrated except in accordance with the following claims.

We claim:

1. A dispensing device for packaged goods comprising, means for supporting two columns of packages with one column disposed directly behind the other, a drawer having side and bottom walls and adapted to contain two packages one directly beneath each column when the drawer is in closed position, means for supporting said drawer for sliding movement from its closed to an open position in which the package in the front portion of the drawer may be removed, means for supporting the rear column of packages above the upper level of the drawer bottom when the drawer is in open position, the front column of packages being then supported by the package in the rear of the drawer, whereby when the drawer is closed after removal of a package the weight of the front column of packages on the remaining package in the drawer will cause that package to remain beneath the front column as the drawer slides to closed position despite the frictional engagement of the drawer and package so that said remaining package is disposed in the front portion of the drawer when the latter is again in closed position, and the bottommost package in the rear column drops into the rear portion of the drawer.

2. In a dispensing device as defined in claim 1, said means for supporting the rear column of packages above the upper level of the drawer when the drawer is in open position, comprising a tray secured to the rear of the drawer, said tray comprising movably connected sections so as to be flexible in a vertical plane and rigid in a horizontal plane, and guide and support mechanism supported by said frame structure for slidably engaging means projecting from the side edges of said tray, said guide and support mechanism extending rearwardly of the upper level of the drawer and then curving upwardly along the rear of said frame structure, whereby said tray and its guiding and supporting mechanism are unitary with said frame structure.

3. In a dispensing device as defined in claim 1, said means for supporting the rear column of packages above the upper level of the drawer when the drawer is in open position comprising a tray flexible in a vertical plane, said drawer having a rear wall pivotally attached to the tray, said rear wall having a rearwardly extending upwardly sloping portion serving as a cam to assure movement of the tray beneath the forward column of packages as the drawer is moved to its fully open position.

ALBERT L. LAMBERT.
EDGARD C. FRANCO-FERREIRA.

REFERENCES CITED

The following references are of record in the file of this patent:

UNITED STATES PATENTS

| Number | Name | Date |
| --- | --- | --- |
| 1,241,188 | Blakemore | Sept. 25, 1917 |
| 1,633,588 | Klivenberg | June 28, 1927 |
| 1,648,813 | Kelly | Nov. 8, 1927 |
| 1,700,299 | Wolters | Jan. 29, 1929 |
| 2,380,093 | Wilder | July 10, 1945 |

FOREIGN PATENTS

| Number | Country | Date |
| --- | --- | --- |
| 232,830 | Germany | 1911 |